(12) United States Patent
Tseng et al.

(10) Patent No.: US 9,568,677 B2
(45) Date of Patent: Feb. 14, 2017

(54) WAVEGUIDE STRUCTURE AND METHOD FOR FABRICATING THE SAME

(71) Applicant: TAIWAN SEMICONDUCTOR MANUFACTURING CO., LTD, Hsin-Chu (TW)

(72) Inventors: Chun-Hao Tseng, Taichung (TW); Ying-Hao Kuo, Hsinchu (TW); Hai-Ching Chen, Hsinchu (TW); Tien-I Bao, Dayuan Township (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 444 days.

(21) Appl. No.: 13/905,404

(22) Filed: May 30, 2013

(65) Prior Publication Data

US 2014/0355929 A1  Dec. 4, 2014

(51) Int. Cl.
*G02B 6/136* (2006.01)
*G02B 6/43* (2006.01)
*G02B 6/12* (2006.01)

(52) U.S. Cl.
CPC .......... *G02B 6/136* (2013.01); *G02B 6/12004* (2013.01); *G02B 6/43* (2013.01)

(58) Field of Classification Search
CPC .............. G02B 6/4214; G02B 6/12004; G02B 2006/12104; G02B 6/43; G02B 6/136
See application file for complete search history.

(56) References Cited

U.S. PATENT DOCUMENTS

| | | | |
|---|---|---|---|
| 6,714,696 B2* | 3/2004 | Kishimoto | G02B 6/12002 372/45.01 |
| 7,933,478 B2* | 4/2011 | Wei | B29D 11/00663 385/38 |
| 8,842,945 B2* | 9/2014 | Nguyen | G02B 6/12004 385/1 |
| 2009/0214170 A1 | 8/2009 | Wei et al. | |

FOREIGN PATENT DOCUMENTS

CN  102016662 A  4/2011

* cited by examiner

*Primary Examiner* — John M Bedtelyon
(74) *Attorney, Agent, or Firm* — Birch, Stewart, Kolasch & Birch, LLP

(57) ABSTRACT

Embodiments of forming a waveguide structure are provided. The waveguide structure includes a substrate, and the substrate has an interconnection region and a waveguide region. The waveguide structure also includes a trench formed in the substrate, and the trench has a sloping sidewall surface and a substantially flat bottom. The waveguide structure further includes a bottom cladding layer formed on the substrate, and the bottom cladding layer extends from the interconnection region to the waveguide region, and the bottom cladding layer acts as an insulating layer in the interconnection region. The waveguide structure further includes a metal layer formed on the bottom cladding layer on the sloping sidewall surface.

20 Claims, 14 Drawing Sheets

WAVEGUIDE STRUCTURE AND METHOD FOR FABRICATING THE SAME

BACKGROUND

The semiconductor integrated circuit (IC) industry has experienced exponential growth. Technological advances in IC design and material have produced generations of ICs where each generation has smaller and more complex circuits than previous generation. In the course of IC evolution, functional density (i.e., the number of interconnected devices per chip area) has generally increased while geometry size (i.e., the smallest component (or line) that can be created using a fabrication process) has decreased.

Manufacturing of waveguide structure has experienced exponential growth. The waveguide structures have attracted a lot of attentions because of its process availability and manufacturing feasibility. In general, a light is confined in the waveguide structure by a total internal reflection from the waveguide walls. However, the manufacturing of the waveguide structure has challenges.

BRIEF DESCRIPTION OF THE DRAWING

For a more complete understanding of the present disclosure, and the advantages thereof, reference is now made to the following descriptions taken in conjunction with the accompanying drawings, in which.

DETAILED DESCRIPTION

It is to be understood that the following disclosure provides many different embodiments, or examples, for implementing different features of the disclosure. Specific examples of components and arrangements are described below to simplify the present disclosure. These are, of course, merely examples and are not intended to be limiting. Moreover, the performance of a first process before a second process in the description that follows may include embodiments in which the second process is performed immediately after the first process, and may also include embodiments in which additional processes may be performed between the first and second processes. Various features may be arbitrarily drawn in different scales for the sake of simplicity and clarity. Furthermore, the formation of a first feature over or on a second feature in the description that follows include embodiments in which the first and second features are formed in direct contact, and may also include embodiments in which additional features may be formed between the first and second features, such that the first and second features may not be in direct contact.

Figure 1:
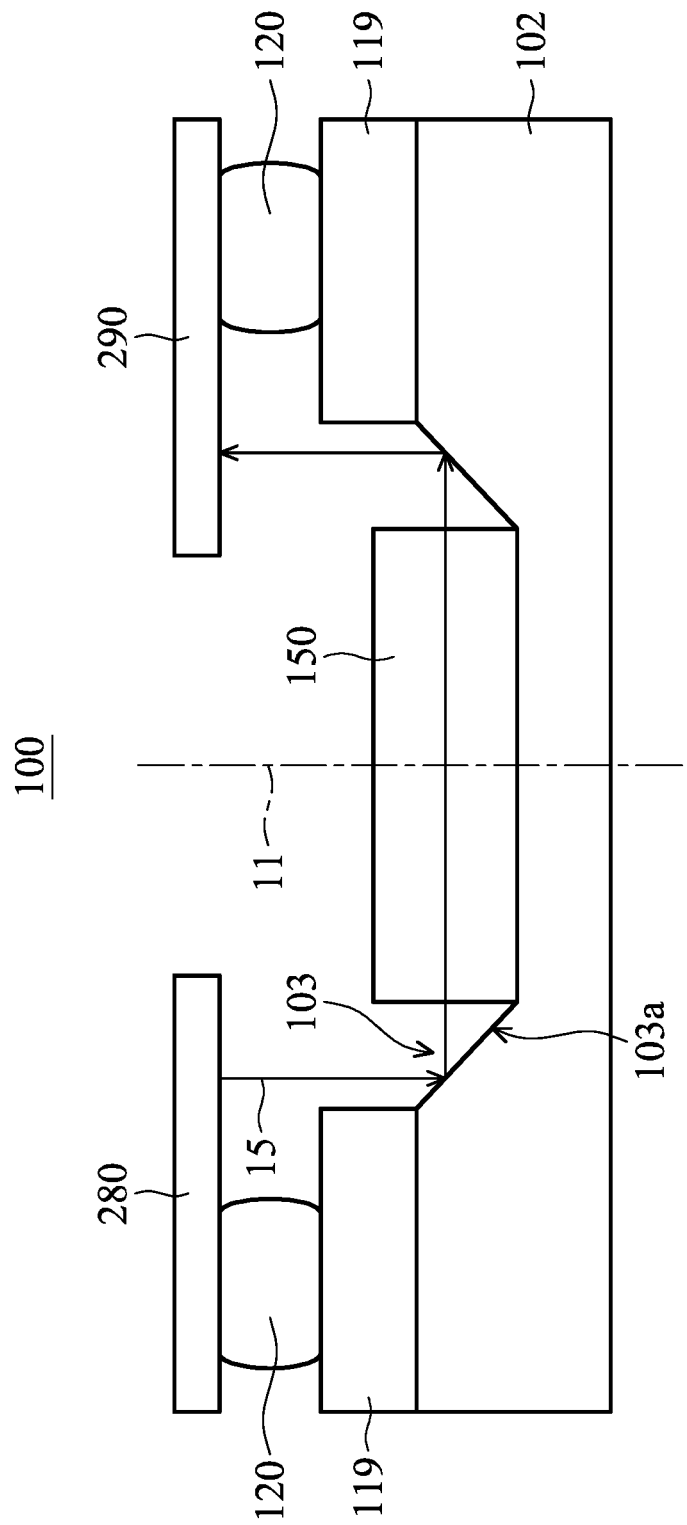
FIG. 1 shows a cross-sectional schematic diagram of a waveguide structure in accordance with an embodiment of the disclosure.

FIG. 1 shows a cross-sectional schematic diagram of a waveguide structure 100 in accordance with an embodiment of the disclosure. A trench 103 is formed in a substrate 102, and a waveguiding structure 150 is formed in the trench 103. The interconnection structures 119 and the bump structures 120 are formed on the substrate 102. A laser diode 280 is disposed on the bump structure 120 on the left side of the line 11, and a photo diode 290 is disposed on the bump structure 120 on a right side of the line 11. The light path 15 emitted from the laser diode 280 is reflected by a sloping sidewall surface 103a of the trench 103 on a left side, and the light path 15 travels through the waveguiding structure 150, reflected by another sloping sidewall surface 103a of the trench 103 on the right side, and then to the photo diode 290. However, in this embodiment, the interconnection structures 119 are formed before the trench 103, and thus the interconnection structures 119 may be damaged by the etching processes for forming the trench 103.

Figure 2A:
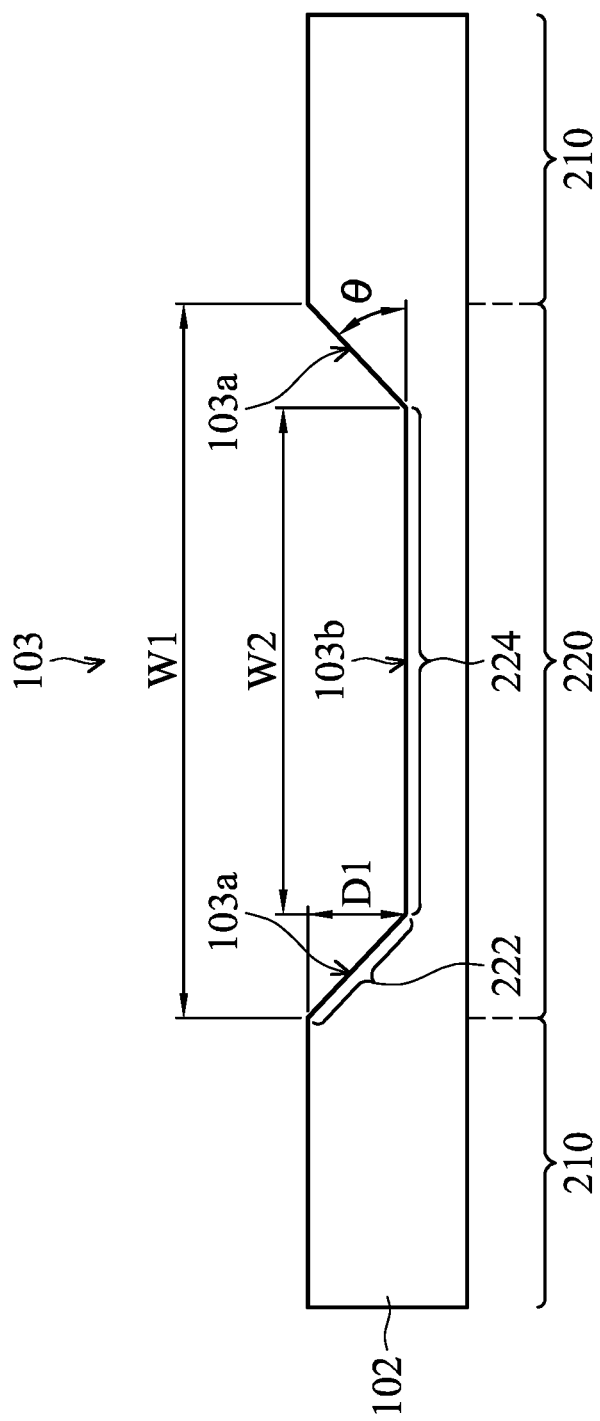
FIGS. 2A-2K show cross-sectional schematic representations of various stages of fabricating a waveguide structure in accordance with an embodiment of the disclosure.

FIGS. 2A-2K show schematic diagrams of various steps of fabrication process of the waveguide structure 200 in accordance with a first embodiment of the disclosure. Referring to FIG. 2A, the substrate 102 is provided. The substrate 102 includes silicon. Alternatively or additionally, the substrate 102 includes other elementary semiconductor such as germanium. The substrate 102 may also include a compound semiconductor such as silicon carbide, gallium arsenic, indium arsenide, and indium phosphide. The substrate 102 may include an alloy semiconductor such as silicon germanium, silicon germanium carbide, gallium arsenic phosphide, and gallium indium phosphide. In one embodiment, the substrate 102 includes an epitaxial layer. For example, the substrate 102 has an epitaxial layer overlying a bulk semiconductor. Furthermore, the substrate 102 may include a semiconductor-on-insulator (SOI) structure. For example, the substrate 102 includes a buried oxide (BOX) layer formed by a process such as separation by implanted oxygen (SIMOX) or other suitable techniques, such as wafer bonding and grinding.

The substrate 102 is divided into two regions: an interconnection region 210 and a waveguide region 220. The interconnection region 210 provides interconnections between substrate 102 and various components, such as diode, and input/output of an IC device. The waveguide region 220 is used to form a waveguiding structure, which will be described later. The waveguide region 220 has a reflecting region 222 and a wave-transmission region 224.

The trench 103 is formed in the substrate 102 in the waveguide region 220. The trench 103 has an upper portion with a width (W1) and a bottom portion with a width (W2), and W1 is larger than W2. The trench 103 has a depth (D1). In some embodiments, the width (W1) of the trench 103 is in a range from about 10 μm to about 1 mm, the width (W2) is in a range from about 8 μm to about 0.8 mm, and the depth (D1) of the trench 103 is in a range from about 20 μm to about 100 μm.

The trench 103 has a sloping sidewall surface 103a and a flat bottom 103b, and the sloping sidewall 103a has a slope angle (θ), which is an acute angle between the sloping sidewall surface 103a and a bottom surface of the substrate 102. In some embodiments, the slope angle (θ) is in a range from about 42 degree to about 48 degree. In one embodiment, the slope angle (θ) is about 45 degree. The trench 103 may be formed by a wet etching process, dry etching process or combinations thereof For example, the wet etch process includes etchants such as ethylene diamine pyrocatechol (EDP), potassium hydroxide (KOH) or tetramethyl ammonium hydroxide (TMAH).

In some embodiments, a potassium hydroxide (KOH) mixed with isopropane alcohol (IPA) is used. In order to control the slope angle (θ), the anisotropic wet etching process is achieved by using a KOH (in a range from about 25 wt % to about 35 wt % in water) with a range from 0.1% to about 5 wt % IPA quantity. The temperature is kept at a range from about 60° C. to about 70° C. during the wet etching process to achieve a controllable etch rate in a range from about 0.2 micron to about 0.6 micron per minute.

Figure 2B:
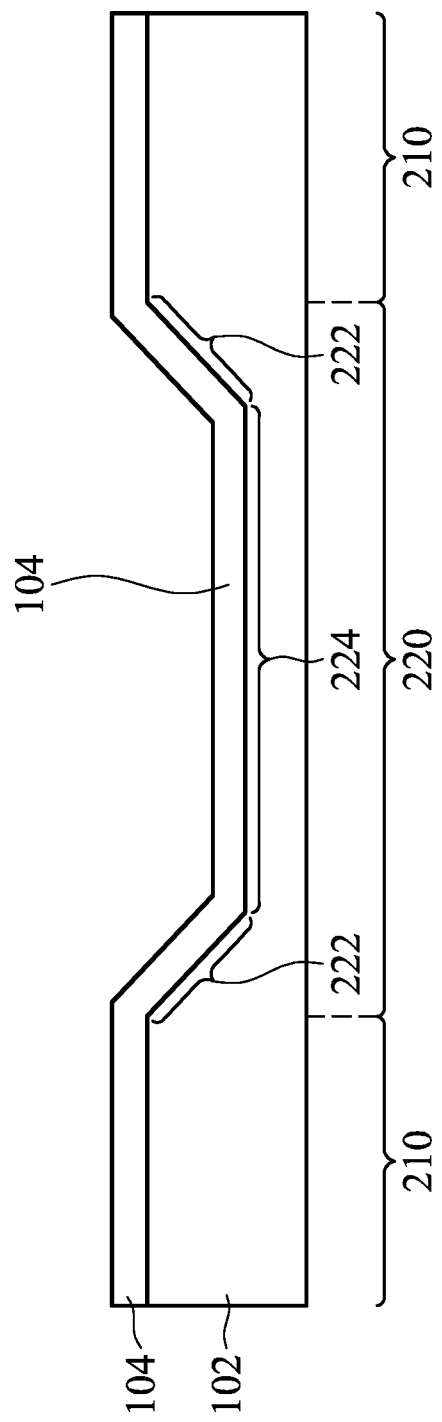

Referring to FIG. 2B, a bottom cladding layer 104 is formed on the substrate 102. The bottom cladding layer 104 is conformally formed on the substrate 102 in the interconnection region 210 and the waveguide region 220. Note that the bottom cladding layer 104 is a continuous structure which extends from the interconnection region 210 through the reflecting region 222 to the wave-transmission region 224.

The continuous bottom cladding layer 104 provides two functions. The bottom cladding layer 104 deposited in the interconnection region 210 is used as an insulating layer for a redistribution layer (RDL layer), which will be described later. In addition, the bottom cladding layer 104 deposited in the waveguide region 220 is used as a portion of a waveguiding structure, which will be described later. The function of the bottom cladding layer 104 is used to make the light stay in the waveguiding structure 150 without skipping to the substrate 102.

The bottom cladding layer 104 may be made of organic material or inorganic material. For example, the organic material may be made of organic polymers such as siloxane based polymer or acrylate based polymer, or inorganic-organic hybrid polymer (siloxane-acrylate or siloxane-epoxy). For example, the inorganic material may be formed of silicon oxide, silicon nitride or silicon oxynitride, silicon or spin on glass (SOG). The bottom cladding layer 104 may be formed by a spin-on method, chemical vapor deposition (CVD) (such as plasma-enhanced CVD (PE-CVD)), physical vapor deposition (PVD) (such as sputtering) or other suitable method. In some embodiments, the bottom cladding layer 104 is formed of siloxane based polymer by a spin-on method. The advantage of the spin-on method is that the fabricating cost is lower than other deposition method.

In some embodiments, the thickness of the bottom cladding layer 104 is in a range from about 1 μm to about 10 μm. In some embodiments, the thickness of the bottom cladding layer 104 is in a range from about 1 μm to about 3 μm.

Figure 2C:
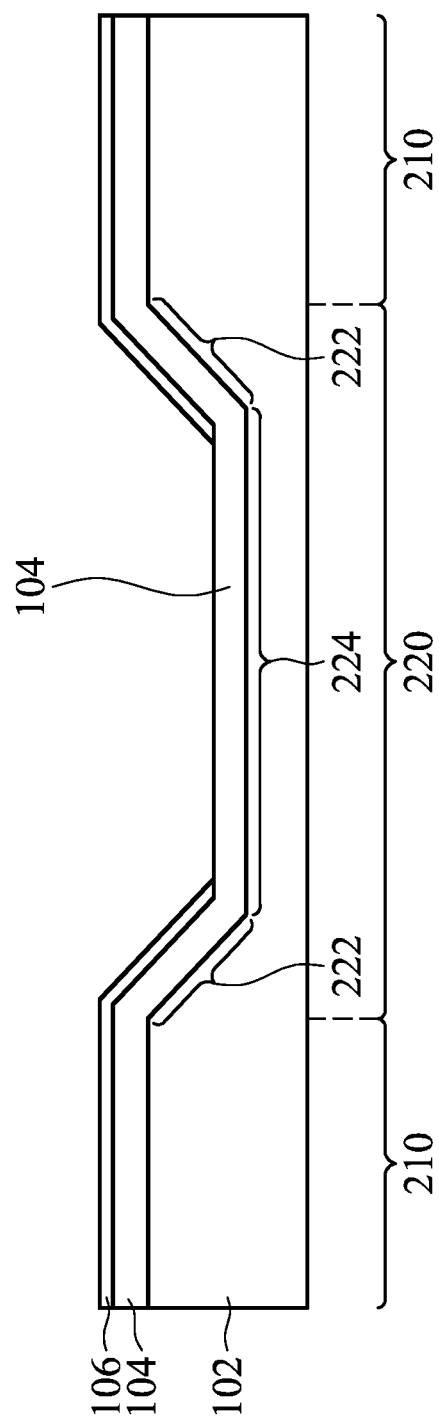

Referring to FIG. 2C, a metal layer 106 is formed on the bottom cladding layer 104. A photoresist layer is formed on the metal layer 106 and patterned to cover the regions which are not removed. Then, the portion of the metal layer 106 in the wave-transmission region 224 is removed by an etching process which leaves the metal layer 106 over regions 210, 222.

In some embodiments, before forming the metal layer 106, an adhesion layer (not shown), such as a Ti, Cr or other applicable adhesion layer, is formed over the bottom cladding layer 104.

The metal layer 106 provides two functions. The metal layer 106 formed on the bottom cladding layer 104 in the interconnection region 210 is used as a plating seed layer and/or under bump metallization (UBM) layer to facilitate the formation of the redistribution layer (RDL layer) 114. In addition, the metal layer 106 formed on the sloping sidewall surfaces 103a (or in the reflecting region 222) is used to reflect light from the laser diode 280 to the photo diode 290 (referring to FIG. 1).

In some embodiments, the metal layer 106 has a thickness in a range from about 0.1 μm to about 0.5 μm. In some embodiments, the meal layer 106 could be able to achieve reflectivity of equal to or greater than 80%. In some embodiments, the meal layer 106 could be able to achieve reflectivity of equal to or greater than 90%. The metal layer 106 may be made of Al, Cu, Ag, Au or combinations thereof The metal layer 106 is deposited by physical vapor deposition (PVD) or plating method. Any other suitable metal materials or processes can also be used.

Figure 2D:
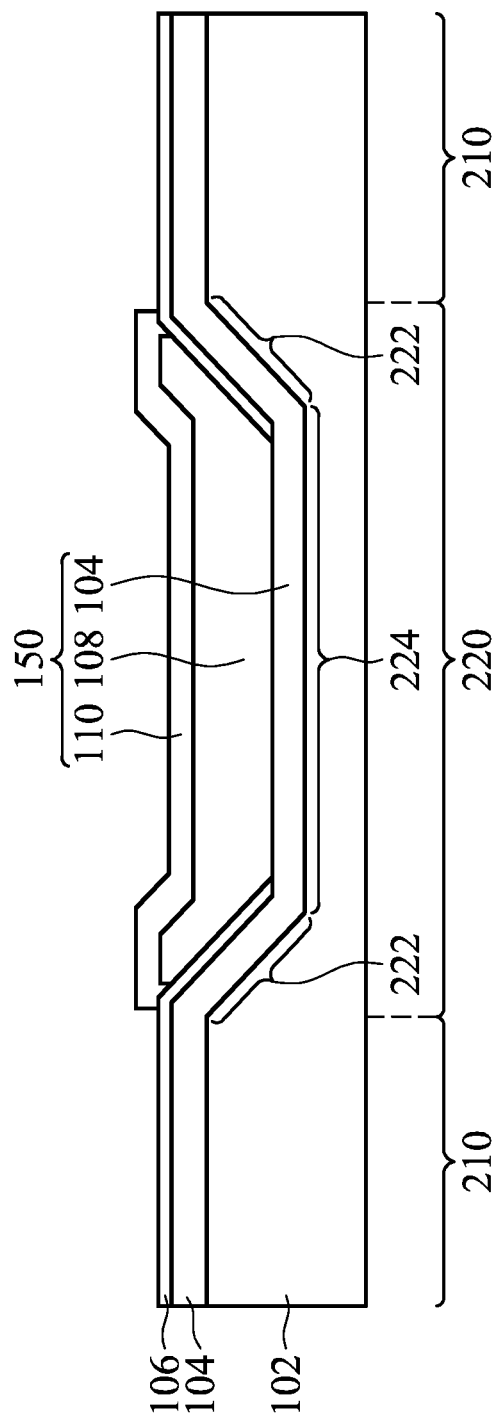

Afterwards, referring to FIG. 2D, a core layer 108 is deposited over the substrate 102 and then patterned to leave the core layer 108 in reflecting region 222 and the wave-transmission region 224 by a photolithography process. The core layer 108 is a main transmission layer through which the light travels. An exemplary photolithography process include the processing steps of photoresist coating, soft baking, mask aligning, exposing, post-exposure baking, developing photoresist and hard baking. The photolithography exposing process may also be implemented or replaced by other methods such as maskless photolithography, electron-beam writing, ion-beam writing, and molecular imprinting. The etch technique includes dry etching, wet etching, or a combination of dry and wet etching.

Afterwards, a top cladding layer 110 is deposited over the substrate 102 and then patterned by the photolithography process. The top cladding layer 110 in the interconnection region 210 is removed to cover the core layer 108. The function of the top cladding layer 110 is similar to that of the bottom cladding layer 104 and is used to make the light stay in the core layer 108. The core layer 108 and top cladding layer 110 are transparent to the wavelengths of the diode to prevent light from being absorbed by the core layer 108 or top cladding layer 110. In some embodiments, the wavelengths transmitted by the waveguide structure 200 are in a range from about 600 nm to about 1600 nm.

The waveguiding structure 150 is constructed by the bottom cladding layer 104, the core layer 108 and the top cladding layer 110. The waveguiding structure 150 formed in the trench 103 provides an optical medium for the light transimitting from the laser diode 280 to the photo diode 290.

In order to achieve total reflection in the waveguiding structure 150, a refractive index of the core layer 108 is larger than that of the bottom cladding layer 104 and the top cladding layer 110. When the light hit the bottom cladding layer 104 or the top cladding layer 110, it comes back to the core layer 108 due to the refractive index difference. Thus, the light stays trapped in the core layer 108 and travel through the waveguiding structure 150. In some embodiments, the refractive index difference is in a range from 0.02 to about 0.2. In some embodiment, the refractive index of the core layer 108 is in a range from about 1.4 to about 1.6. In some embodiments, the refractive index of the bottom cladding layer 104 or the top cladding layer 110 is in a range from about 1.4 to about 1.6.

The material of the core layer 108 may be polymer. The core layer 108 may be made of epoxy based polymer, polymide (PI) or polybenzobisoxazole (PBO). The core layer 108 may be formed by a spin-on method in some embodiments. The thickness of the core layer 108 is at least 10 μm in some embodiments. In some embodiments, the thickness of the core layer 108 is in a range from about 10 μm to about 50 μm.

The top cladding layer 110 is a dielectric layer. The top cladding layer 110 may be made of polymer, such as siloxane based polymer or acrylate based polymer, or inorganic-organic hybrid polymer (siloxane-acrylate or siloxane-epoxy). The top cladding layer 110 may be formed by a spin-on method in some embodiments. In some embodiments, the material of the bottom cladding layer 104 is the same with that of the top cladding layer 110. The thickness of the top cladding layer 110 is at least about 1 µm in some embodiments to prevent optical leakage. In some embodiments, the thickness of the top cladding layer 110 is in a range from about 1 µm to about 10 µm.

Figure 2E:
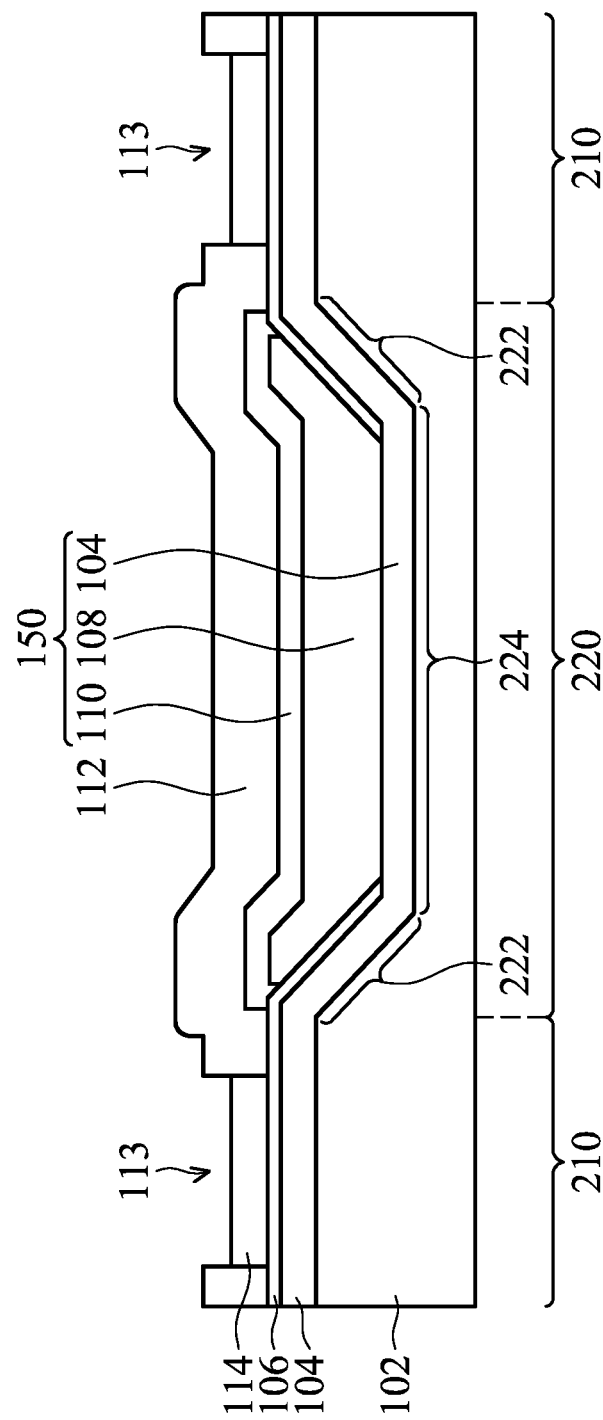

Afterwards, referring to FIG. 2E, a photoreisit layer 112 is deposited over the metal layer 106 and patterned by a photolithography process to form openings 113 to expose the metal layer 106 in the interconnection region 210.

Then, a redistribution layer (RDL) 114 is formed in the opening 113 and on the metal layer 106 for forming metal routes and metal traces for electrical signal propagation. However, in some embodiments, there are more than one redistribution layers (RDLs) 114. The redistribution layer (RDL) 114 may be formed by a plating method, physical vapor deposition (PVD), chemical vapor deposition (CVD), atomic layer deposition (ALD) or combinations thereof. For example, when the redistribution layer (RDL) 114 is formed by the plating method, the metal layer 106 acts as a plating seed layer. The redistribution layer (RDL) 114 may be made of aluminum (Al), aluminum (Al) alloy, copper (Cu), copper (Cu) alloy, titanium (Ti), titanium (Ti) alloy, tungsten (W), tungsten (W) alloy or combinations thereof or other applicable conductive materials.

The redistribution layer (RDL) 114 has a thickness in a range from about 1 µm to about 5 µm. For example, for high speed applications over 2 Gbps, the redistribution layer (RDL) 114 has a thickness of larger than about 2 µm. In some embodiments, the redistribution layer (RDL) 114 has a thickness in a range from about 1 to about 3 µm.

In other embodiments, when the redistribution layer (RDL) 114 is formed by the plating method, the material for the bottom cladding layer 104 underlying the redistribution layer (RDL) 114 has more choices, because the plating method is performed under a lower temperature, such as less than about 250° C., the bottom cladding layer 104 could be made by polymer which is compatible with low temperature.

Figure 2F:
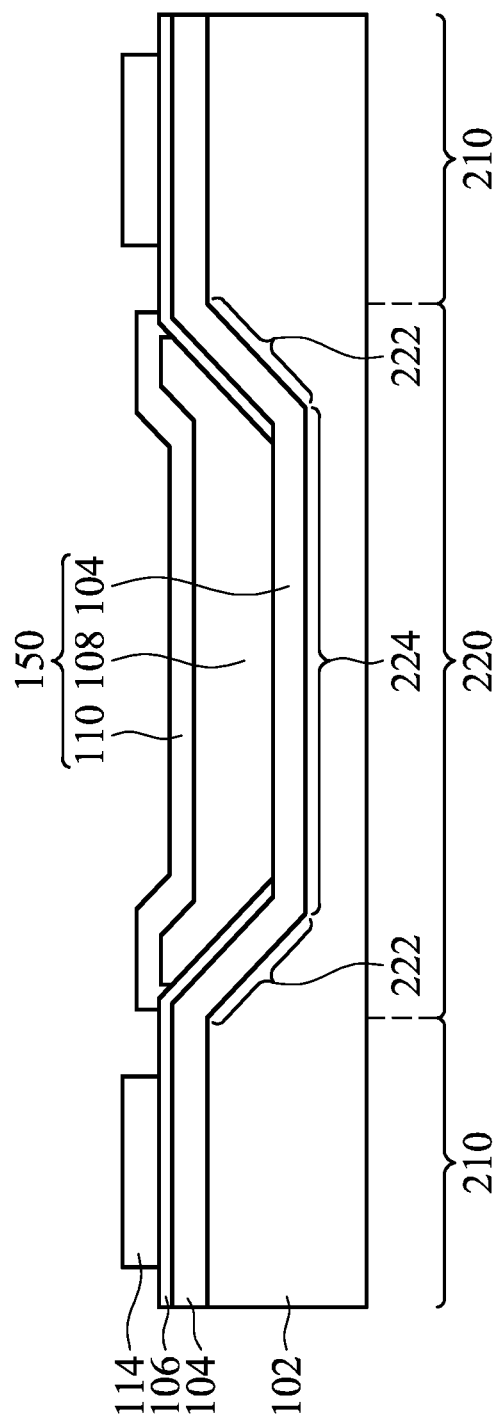
Figure 2G:
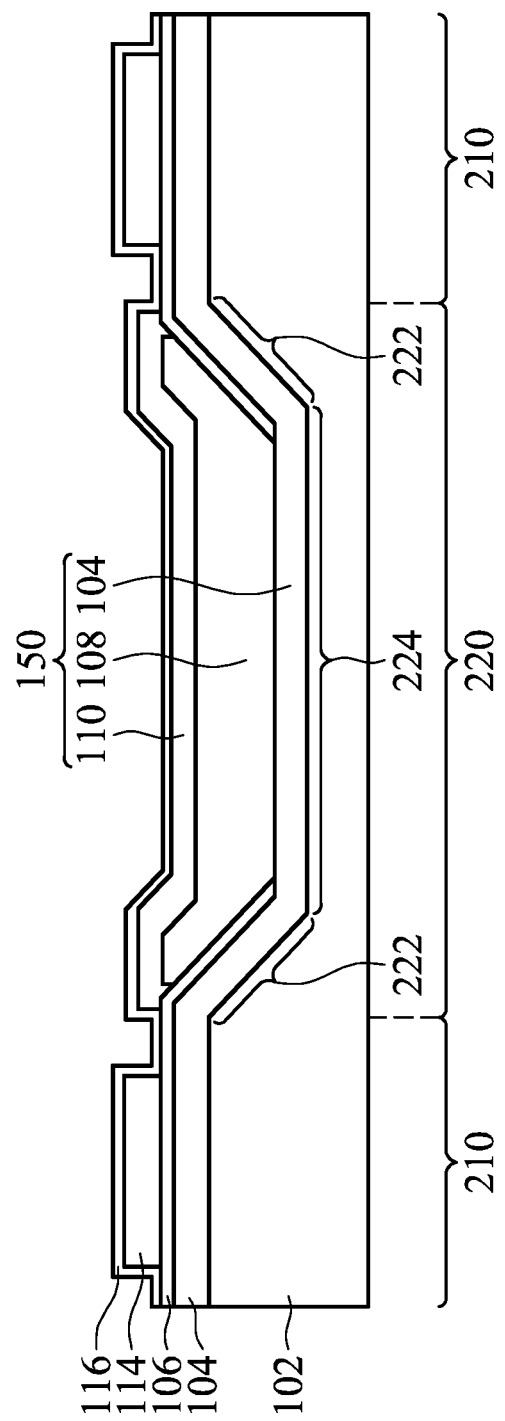

Afterwards, the photoreisit layer 112 is removed as shown in FIG. 2F. Referring to FIG. 2G, a passivation layer 116 is formed on the redistribution layer (RDL) 114 and the top cladding layer 110 to protect the underlying layers. The passivation layer 116 may be made of polymer, silicon oxide or silicon nitride. The passivation layer 116 may be formed by a spin-on method, chemical vapor deposition (CVD) or physical vapor deposition (PVD).

Figure 2H:
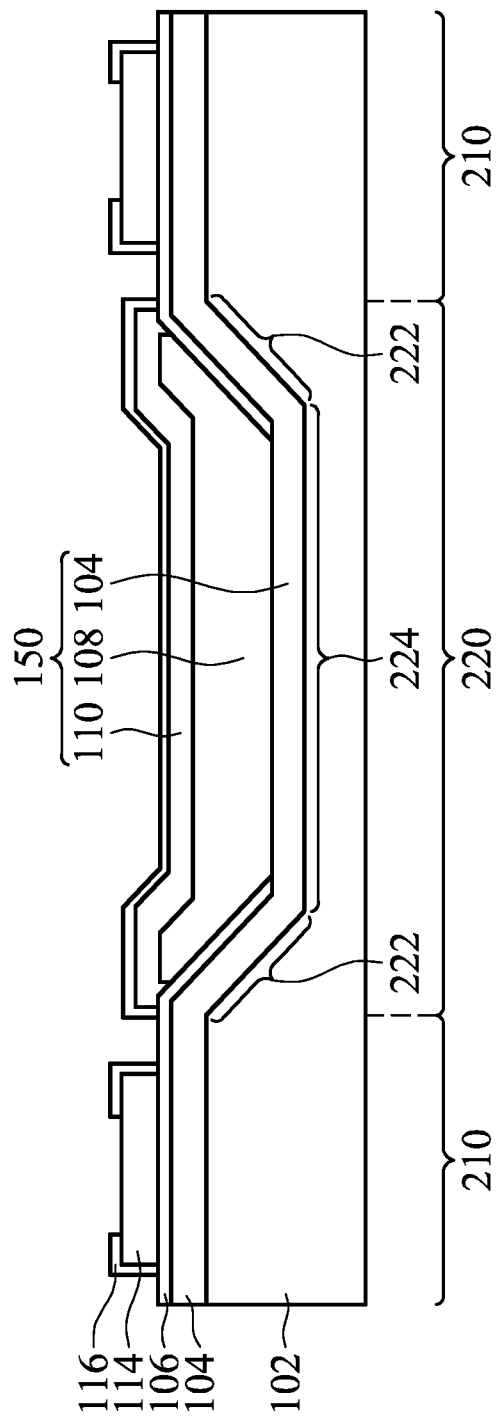
Figure 2I:
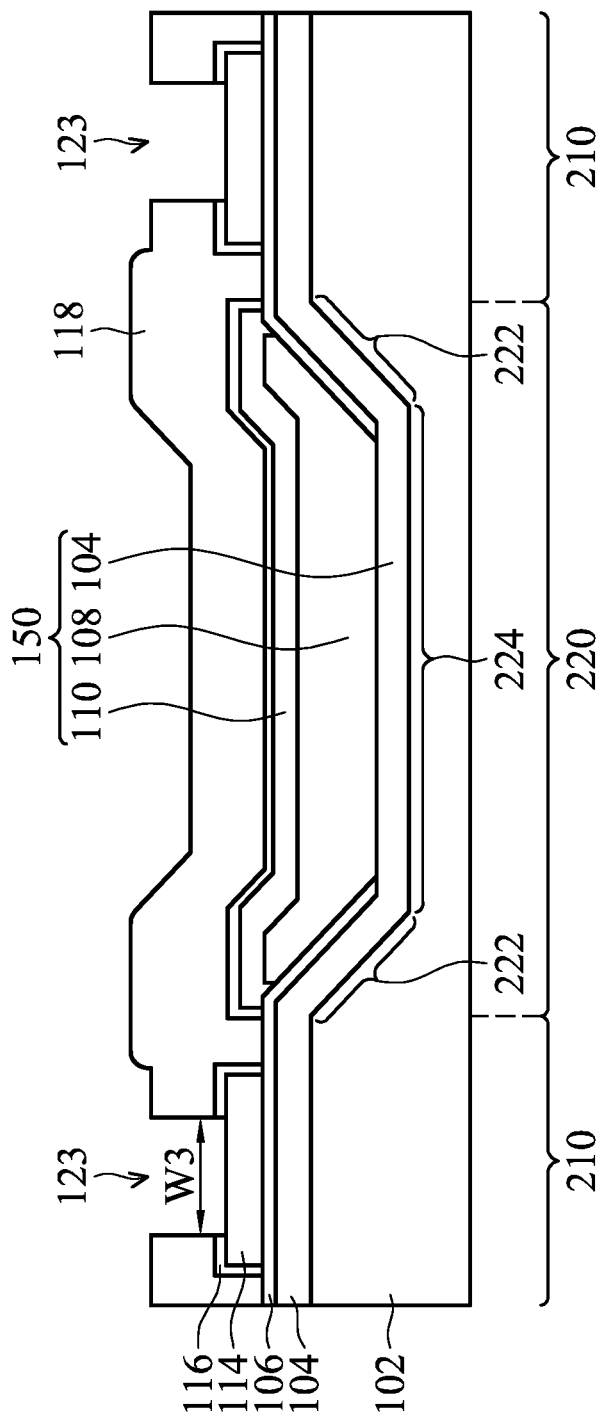

Referring to FIG. 2H, a portion of the passivation layer 116 is removed to expose the redistribution layer (RDL) 114 by the etching processes. Referring to FIG. 2I, a photoresist layer 118 is then deposited on the waveguiding structure 150 and the redistribution layer (RDL) 114 and then patterned. The patterned photoresist layer 118 contains an opening 123 to expose the redistribution layer (RDL) 114. In some embodiments, the opening 123 has a width W3 in a range from about 1 µm to about 50 µm to comply with the size of the bump structure 120.

Figure 2J:
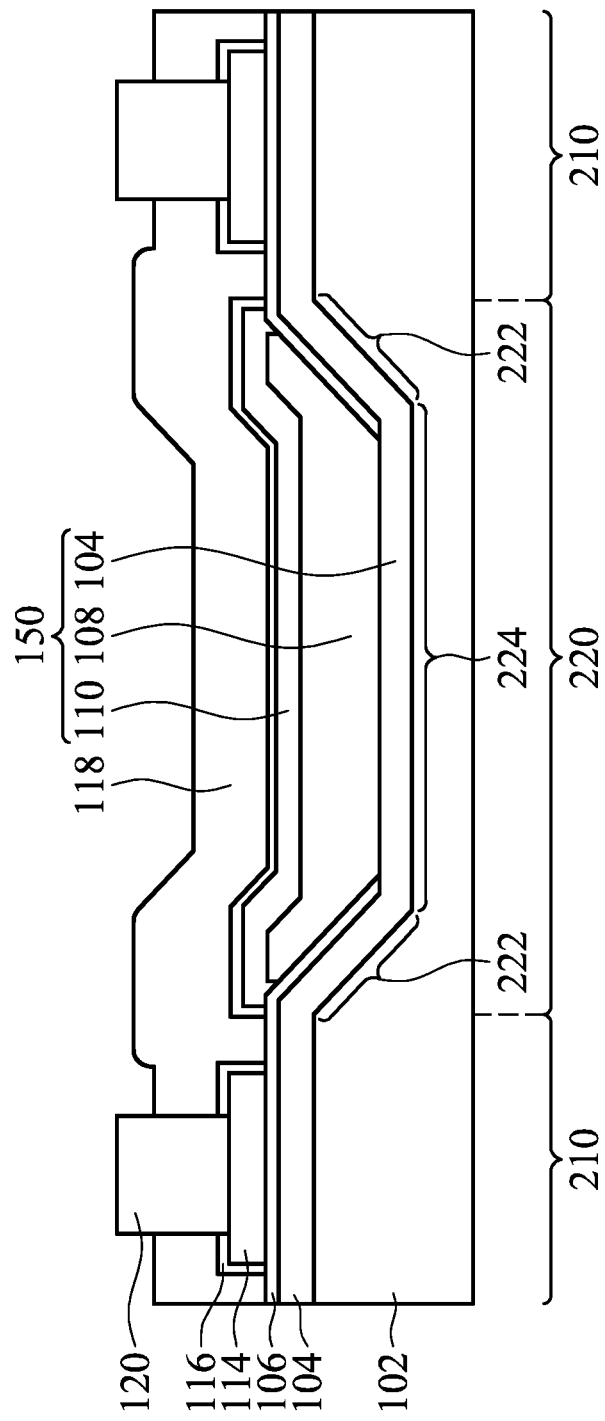

Referring to FIG. 2J, the bump structure 120 is formed or placed in the opening 123 to contact the redistribution layer (RDL) 114. The bump structure 120 may be made of Cu, Cu alloy, Al, Al alloy, Sn, Sn alloy or combinations thereof. In some embodiments, the bump structure 120 is a solder bump structure. The bump structure 120 may be formed by a variety of methods, including evaporation, plating method, printing, jetting, stud bumping, and direct placement a solder ball. The bump structure 120 may be regular solder or lead-free free solder in some embodiments. In other embodiments, the bump structure 120 may be micro bumps or regular bumps for flip-chip bonding with semiconductor-based optical and electrical chips.

In some embodiments, an under bump metallization (UBM) layer is optionally deposited between the bump structure 120 and the redistribution layer (RDL) 114 by evaporation, plating method and formed. The thickness of the bump structure 120 is in a range from about 1 µm to about 50 µm in some embodiments.

Figure 2K:
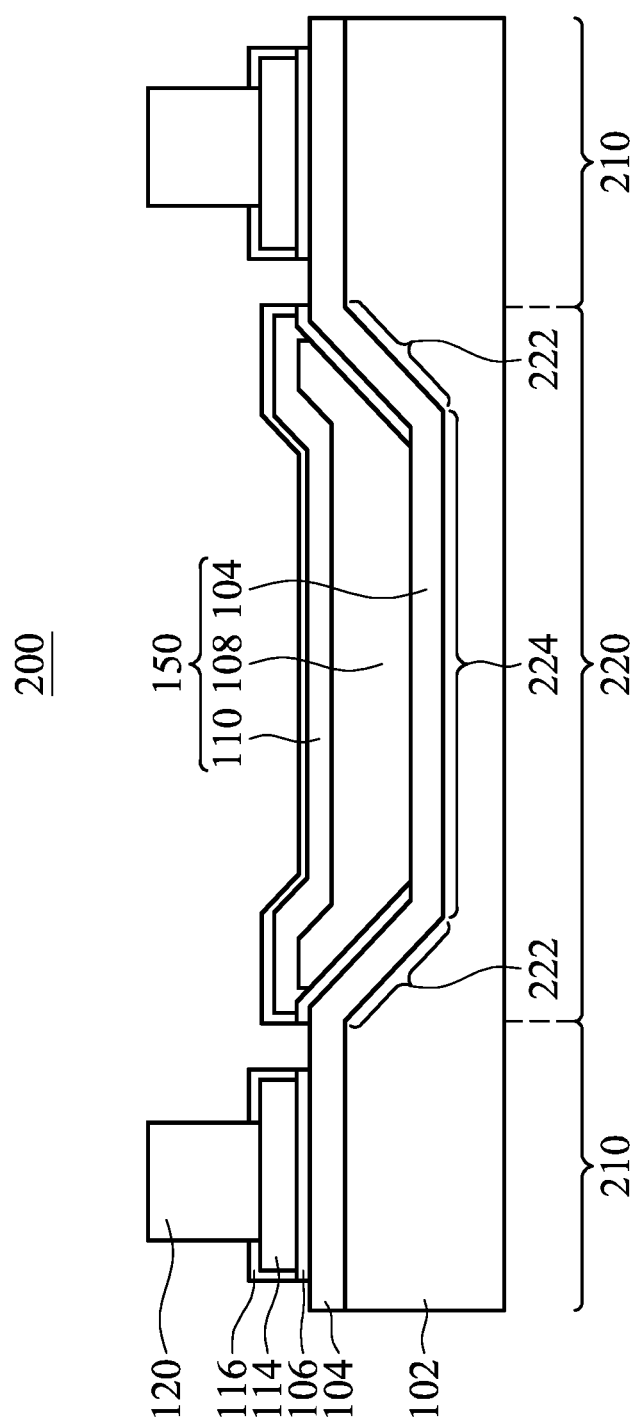

Referring to FIG. 2K, the patterned photoresist layer 118 and the exposed metal layer 106 not covered by the redistribution layer (RDL) 114 are removed by etching processes or stripping processes.

In the embodiment shown in FIG. 1, the redistribution layer (RDL) are formed before the trench, and thus the redistribution layer (RDL) may be damaged by the etching process for forming the trench. In contrast, in some embodiments, the redistribution layers (RDLs) is formed after the trench, and therefore the redistribution layer (RDL) could not be damaged by the etching process for forming the trench. Additionally, the continuous bottom cladding layer 104 is a portion of the waveguiding structure 150 and is used as the insulating layer for the redistribution layer (RDL). Thus, fabrication methods are simplified and cost is lowered.

Figure 3:
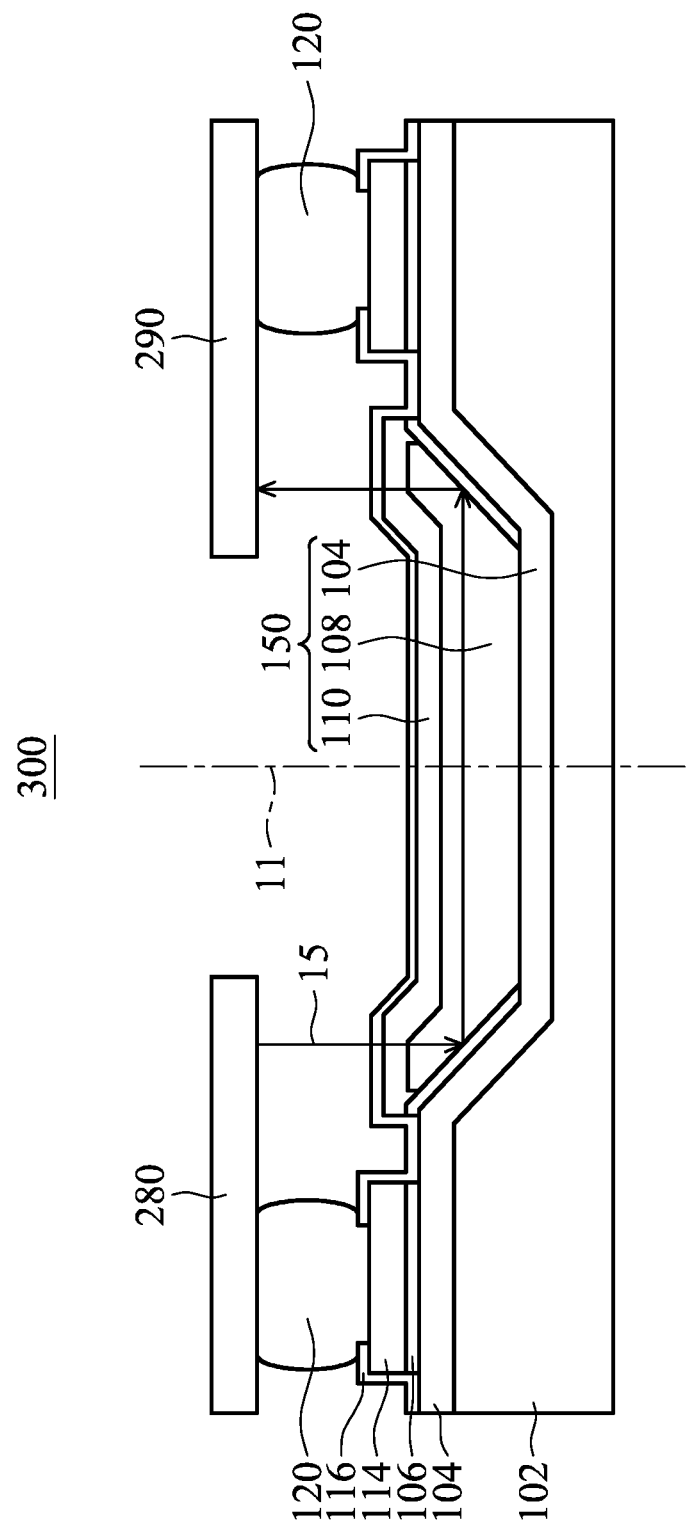
FIG. 3 shows a cross-sectional schematic diagram of the electro-optical device in accordance with an embodiment of the disclosure.

FIG. 3 shows a cross-sectional schematic diagram of an electro-optical device 300 in accordance with a second embodiment of the disclosure. As shown in FIG. 3, the waveguide structure 300 is fabricated by the above described in reference to FIGS. 2A-2K and then it bonded to the optical components 280,290 by the bump structure 120.

Referring to FIG. 3, optical components 280,290 are mounted on the substrate 102 by a flip-chip method or wire-bonding method. The optical component includes the laser diode 280 or the photo diode 290. The laser diode 280 is disposed on the bump structure 120 on the left side of the line 11, and the photo diode 290 is disposed on the bump structure 120 on the right side of the line 11.

In one embodiment, the optical path is an exemplary light path 15 (electromagnetic wave) emitted from the laser diode 280 which is driven by an IC driver (not shown in figure). The light path 15 is reflected by the metal layer 106 in the reflecting region 222 on a left side, and the light path 15 is through the waveguiding structure 150, reflected by another metal layer 106 in the reflecting region 222 on a right side, and then to the photo diode 290. The photo diode 290 will convert the light into the electrical signal, such as current or voltage, an electrical signal is then transferred to other devices, such as transimpedance amplifier (TIA).

In some embodiments, the laser diode 280 and the photo diode 290 includes III –V semiconductor materials and operate on electromagnetic wavelengths in the range of from 600 nm to about 1600 nm.

Figure 4:
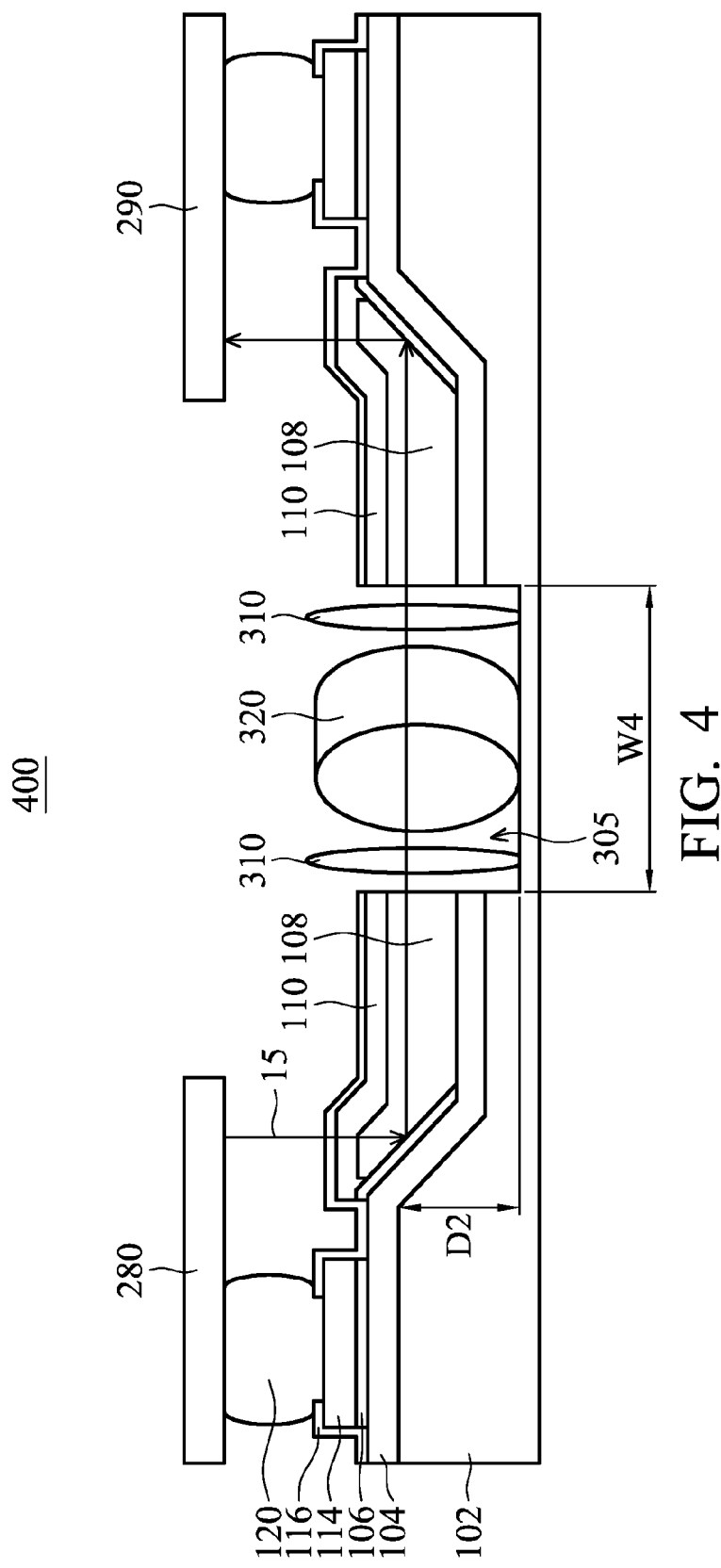
FIG. 4 shows a cross-sectional schematic diagram of the electro-optical device in accordance with an embodiment of the disclosure.

FIG. 4 shows a series of cross-sectional schematic diagrams of the electro-optical device 400 in accordance with an embodiment of the disclosure, wherein like elements are identified by the same reference numbers as in FIG. 3, and thus are omitted for brevity.

In FIG. 4, a groove 305 is formed in the substrate 102 and adjacent to the trench 103, and a depth (D2) of the groove 305 is deeper than the depth (D1) of the trench 103. In some embodiments, the groove 305 may be U-shape. The groove 305 is used to dispose the larger optical transfer devices 310,320 therein and uses a fabrication method like the trench 103. In some embodiment, the depth (D2) of the groove 305 is in a range from about 50 µm to about 200 µm. In some embodiments, a width (W4) of the groove 305 is in a range from about 100 µm to about 300 µm.

The larger dimension of the groove 305 also allows light to couple into and out of optical fibers for out-of chip communication. As shown in FIG. 4, the optical lens 310 and an optical fiber 320 (with a size in a range from about 200 to about 300 μm) are disposed in the groove 305 to transfer the light 15 from the laser diode 280 to the waveguiding structure 150.

In this embodiment, the optical path of the light 15 is elongated by the design of the optical lens 310 and the optical fiber 320. However, the numbers and the locations of the optical lens 310 and the optical fiber 320 are not limited by this embodiment, the numbers and the locations may be adjusted according to the actual application.

Embodiments of mechanism for forming the waveguide structure are provided, the redistribution layer (RDL) are formed after the trench for the waveguide structure, which reduces the damaged redistribution layer (RDL) problem and improves the fabrication yield. Additionally, the bottom cladding layer is used as the insulating layer in the interconnection region, and thus fabrication methods are simplified and cost is lowered.

In some embodiments, a waveguide structure is provided. The waveguide structure includes a substrate, and the substrate has an interconnection region and a waveguide region. The waveguide structure also includes a trench formed in the substrate, and the trench has a sloping sidewall surface and a substantially flat bottom. The waveguide structure further includes a bottom cladding layer formed on the substrate, and the bottom cladding layer extends from the interconnection region to the waveguide region, and the bottom cladding layer acts as an insulating layer in the interconnection region. The waveguide structure further includes a metal layer formed on the bottom cladding layer on the sloping sidewall surface.

In some embodiments, an electro-optical device is provides. The electro-optical device includes a substrate, and the substrate has an interconnection region and a waveguide region, and the waveguide region has a reflecting region and a wave-transmission region. The electro-optical device also includes a trench formed in the substrate in the waveguide region. The electro-optical device further includes a bottom cladding layer formed on the substrate, and the bottom cladding layer extends from the interconnection region through the reflecting region to the wave-transmission region, and the bottom cladding layer acts as an insulating layer in the interconnection region. The electro-optical device further includes a metal layer formed on the bottom cladding layer in the reflecting region. The electro-optical device further includes a laser diode mounted on the substrate. The electro-optical device also includes a photo diode mounted on the substrate.

In some embodiments, a method for fabricating a waveguide structure is provided. The method includes providing a substrate; forming a trench in the substrate, and the trench has a sloping sidewall surface and a substantially flat bottom. The method includes forming a bottom cladding layer on the sloping sidewall surface and the substantially flat bottom; and forming a metal layer on the bottom cladding layer on the sloping sidewall surface.

While the disclosure has been described by way of example and in terms of the embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A waveguide structure, comprising:
   a substrate, wherein the substrate has an interconnection region and a waveguide region;
   a trench formed in the substrate, wherein the trench has a sloping sidewall surface and a substantially flat bottom, wherein the substrate has a flat top surface adjoining the sloping sidewall surface of the trench;
   a bottom cladding layer formed on the substrate, wherein the bottom cladding layer extends from the interconnection region to the waveguide region, and the bottom cladding layer acts as an insulating layer in the interconnection region; and
   a metal layer comprising a first portion and a second portion, wherein the first portion is formed over the flat top surface of the substrate in the interconnection region, the second portion is formed on the bottom cladding layer on the sloping sidewall surface of the trench in the waveguide region, wherein the metal layer is spaced apart from the substrate by the bottom cladding layer, and the first portion is spaced apart from the second portion.

2. The waveguide structure as claimed in claim 1, further comprising:
   a core layer formed on the bottom cladding layer in the waveguide region; and
   a top cladding layer formed on the core layer, wherein a waveguiding structure is formed by the bottom cladding layer, the core layer and the top cladding layer.

3. The waveguide structure as claimed in claim 1, wherein a refractive index of the core layer is larger than that of the bottom cladding layer and the refractive index difference is in a range from about 0.02 to about 0.2.

4. The waveguide structure as claimed in claim 1, wherein the metal layer comprises aluminum (Al), copper (Cu), silver (Ag), gold (Au) or combinations thereof.

5. The waveguide structure as claimed in claim 1, wherein the sloping sidewall surface has a slope angle in a range from about 42 degree to about 48 degree.

6. The waveguide structure as claimed in claim 1, wherein the first portion of the metal layer is formed on the bottom cladding layer in the interconnection region.

7. The waveguide structure as claimed in claim 1, further comprising:
   a redistribution layer (RDL) formed above the first portion of the metal layer in the interconnection region, wherein a bottom surface of the RDL is covered by the first portion of the metal layer.

8. The waveguide structure as claimed in claim 1, wherein the bottom cladding layer has a thickness in a range from 1 μm to about 10 μm.

9. An electro-optical device, comprising:
   a substrate, wherein the substrate has an interconnection region and a waveguide region, and the waveguide region has a reflecting region and a wave-transmission region;
   a trench formed in the substrate in the waveguide region, wherein the trench has a sloping sidewall surface and a substantially flat bottom, and the substrate has a flat top surface adjoining the sloping sidewall surface of the trench;
   a bottom cladding layer formed on the substrate, wherein the bottom cladding layer extends from the interconnection region through the reflecting region to the wave-transmission region and the bottom cladding layer acts as an insulating layer in the interconnection region;

a metal layer comprising a first portion and a second portion, wherein the first portion is formed over the flat top surface of the substrate in the interconnection region, the second portion is formed on the bottom cladding layer on the sloping sidewall surface of the trench in the reflecting region, wherein the metal layer is spaced apart from the substrate by the bottom cladding layer, and the first portion is spaced apart from the second portion;

a laser diode mounted on the substrate; and a photo diode mounted on the substrate.

10. The electro-optical device as claimed in claim 9, wherein the sloping sidewall surface has a slope angle in a range from about 42 degree to about 48 degree.

11. The electro-optical device as claimed in claim 9, further comprising:

a core layer formed on the bottom cladding layer in the waveguide region; and a top cladding layer formed on the core layer, wherein a waveguiding structure is formed by the bottom cladding layer, the core layer and the top cladding layer.

12. The electro-optical device as claimed in claim 9, wherein the first portion of the metal layer is formed on the bottom cladding layer in the interconnection region.

13. The electro-optical device as claimed in claim 9, further comprising:

a redistribution layer (RDL) formed above the first portion of the metal layer in the interconnection region, wherein a bottom surface of the RDL is covered by the first portion of the metal layer.

14. The electro-optical device as claimed in claim 13, further comprising:

a bump structure formed between the redistribution layer (RDL) and the laser diode or the photo diode.

15. The waveguide structure as claimed in claim 9, further comprising:

a groove formed in the substrate and adjacent to the trench; and an optical transfer device mounted in the groove.

16. A method for fabricating a waveguide structure, comprising:

providing a substrate, wherein the substrate has an interconnection region and a waveguide region;

forming a trench in the substrate, wherein the trench has a sloping sidewall surface and a substantially flat bottom, and the substrate has a flat top surface adjoining the sloping sidewall surface of the trench;

forming a bottom cladding layer on the substrate in the interconnection region and the waveguide region; and forming a metal layer comprising a first portion and a second portion, wherein the first portion is formed over the flat top surface of the substrate in the interconnection region, the second portion is formed on the bottom cladding layer on the sloping sidewall surface of the trench in the waveguide region, wherein the metal layer is spaced apart from the substrate by the bottom cladding layer, and the first portion is spaced apart from the second portion.

17. The method for fabricating a waveguide structure as claimed in claim 16, wherein the trench is formed by a wet etching etchant and the wet etching etchant comprises ethylene diamine pyrocatechol (EDP), potassium hydroxide (KOH) or tetramethyl ammonium hydroxide (TMAH).

18. The method for fabricating a waveguide structure as claimed in claim 17, wherein an etch rate of the wet etching etchant is in a range from about 0.2 micron to about 0.6 micron per minute.

19. The method for fabricating a waveguide structure as claimed in claim 16, further comprising:

forming a redistribution layer (RDL) above the first portion of the metal layer in the interconnection region.

20. The method for fabricating a waveguide structure as claimed in claim 19, wherein the redistribution layer (RDL) is formed by a plating method, physical vapor deposition (PVD), chemical vapor deposition (CVD), atomic layer deposition (ALD) or combinations thereof.

\* \* \* \* \*